US005079169A

United States Patent [19]

Chu et al.

[11] Patent Number: 5,079,169

[45] Date of Patent: Jan. 7, 1992

[54] METHOD FOR OPTICALLY MANIPULATING POLYMER FILAMENTS

[75] Inventors: Steven Chu, Stanford, Calif.; Stephen J. Kron, Cambridge, Mass.

[73] Assignee: The Regents of the Stanford Leland Junior University, Stanford, Calif.

[21] Appl. No.: 528,316

[22] Filed: May 22, 1990

[51] Int. Cl.[5] .............................................. G01N 21/76

[52] U.S. Cl. .................................... 436/172; 436/174; 356/36; 435/6; 250/261 R

[58] Field of Search ............................ 435/6; 436/174; 435/174; 536/26, 27, 28; 356/38, 37, 36; 250/251, 361 R

[56] References Cited

U.S. PATENT DOCUMENTS

| | | | |
|---|---|---|---|
| 3,710,279 | 12/1969 | Ashkin . | |
| 3,808,432 | 8/1972 | Ashkin . | |
| 3,808,550 | 4/1974 | Ashkin . | |
| 4,327,288 | 4/1982 | Ashkin et al. . | |
| 4,818,681 | 4/1989 | Dattagupta | 435/6 |
| 4,893,886 | 1/1990 | Ashkin et al. . | |
| 4,897,444 | 1/1990 | Brynes et al. | 435/23 |
| 4,939,360 | 7/1990 | Sakai | 250/251 |

OTHER PUBLICATIONS

Optical trapping, cells manipulation and robotics, Neagley et al., 1/1989.

Ashkin, A., "Applications of Laser Radiation Pressure," Science, vol. 210, No. 4474 (1980).

Ashkin, A., "Acceleration and Trapping of Particles by Radiation Pressure," Phys. Rev. Lett., vol. 24, No. 4 (1970).

Ashkin, A. "Trapping of Atoms by Resonance Radiation Pressure," Phys. Rev. Lett., vol. 40, No. 12 (1978).

Ashkin, A. et al., "Optical Trapping and Manipulation of Viruses and Bacteria," Science, 235:1517 (3/87).

Ashkin, A. et al., "Observation of Radiation-Pressure Trapping of Particles by Alternating Light Beams," 54:12 (3/85).

Ashkin, A. et al., "Optical Levitation by Radiation Pressure," App. Phys. Lett., 19:8 (10/71).

Ashkin, A. et al., "Observation of light scattering from nonspherical particles using optical levitation," App. Optics, 19:5 (3/80).

Ashkin, A. et al., "Optical Trapping and Manipulation of Single Living Cells Using Infra-Red Laser Beams", Ber Bunsenges Phys. Chem., 93:254–260 (1989).

Ashkin, A. et al., "Internal cell manipulation using infrared laser traps", Proc. Natl. Acad. Sci. USA, 86:7914–7918 (10/89).

Ashkin, A. et al., "Observation of a single-bead gradient force optical trap for dielectric particles," Optics letters, 11:288 (5/86).

Ashkin, A. et al., "Optical trapping and manipulation of single cells using infrared laser beams," Nature, 330:24/31 (12/87).

Ashkin, A. et al., "Stability of radiation-pressure particle traps: an optical Earnshaw theorem," Optics Letters, 8:10 (10/83).

Berns et al., "Use of a laser-induced optical force trap to study chromosome movement of the mitotic spindle," Proc. Natl. Acad. Sci. USA, 86:4539–5453 (6/89).

Bjorkholm, J. E. et al., "Observation of Focusing of Neutral Atoms by the Dipole Forces of Resonance-Radiation Pressure," Phys. Rev. Lett., 41:20 (11/78).

Block, S. M. et al., "Compliance of bacterial flagella measured with optical tweezers," Nature, 338:6215 (4/89).

Bussery, B. et al., "Potential Energy Curves and Vibration-Rotation . . .," J. Molec. Spectro, 113:21–27 (1985).

Chu, S. et al., "Experimental Observation of Optically Trapped Atoms," Phys. Rev. Lett., 57:3 (7/86).

Dunlap, D. D. et al., "Images of single-stranded nucleic acids by scanning tunnelling microscopy," Nature, vol. 342 (11/89).

Smith, S. B. et al., "Observation of Individual DNA Molecules Undergoing Gel Electrophoresis," Science, 243:203 (1/89).

Pool, R., "Laser-Cooled Atoms Hit Record Low Temperature," Science, 241:1041 (8/88).

Tadir, Y. et al., "Micromanipulation of sperm by a laser generated optical trap," Fertility and Sterility, 52:5 (11/89).

Tadir, Y. et al., "Force generated by human sperm correlated . . .," Fertility and Sterility, 53:5 (5/90).

Wilchek, M., "The Avidin-Biotin Complex in Bioanalytical Applications," Analytical Biochemistry 171:1-32 (1988).

Williams, C. C., "Microscopy of chemical-potential variations on an atomic scale," Nature, vol. 344 (3/90).

*Primary Examiner*—David L. Lacey
*Assistant Examiner*—Newton Edwards
*Attorney, Agent, or Firm*—Peter J. Dehlinger

[57] ABSTRACT

Method and apparatus for manipulating a microscopic particle by single-beam gradient optical trapping, using an optical beam whose trapping force is substantially independent of position within a view field. The apparatus may be used to extend a polymer filament, and to fix the extended filament at a selected stretching force. When applied to nucleic acid filament, the method may be employed for genomic DNA mapping of filaments up to several megabasepairs in size. The method may also be used for studying the interaction of enzymes or ribosomes with extended DNA in real time.

16 Claims, 7 Drawing Sheets

Fig. 7
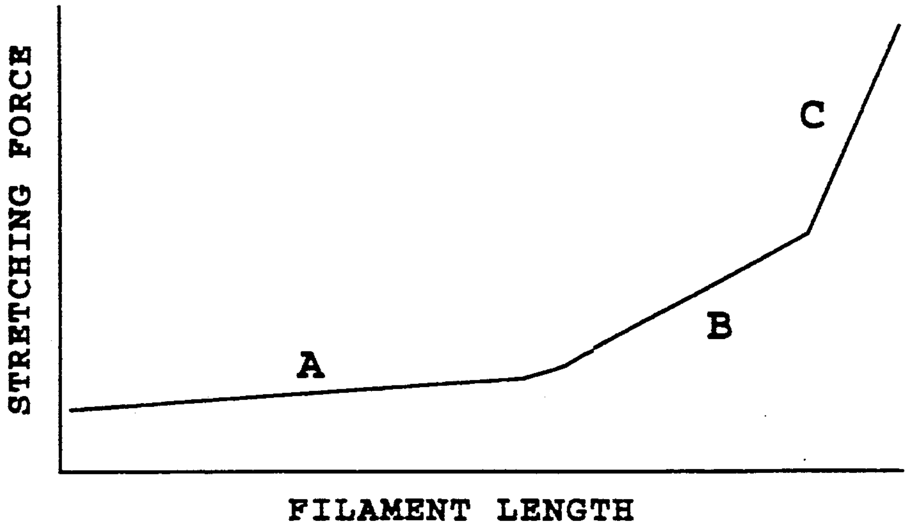
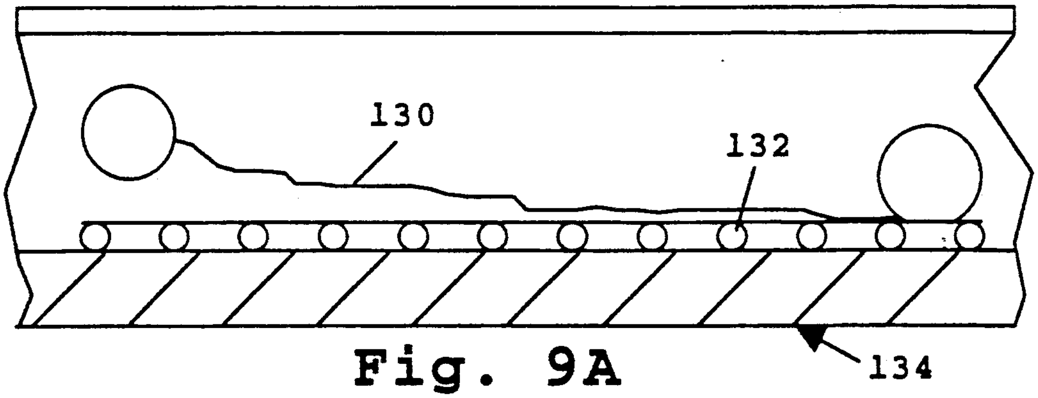
Fig. 9A
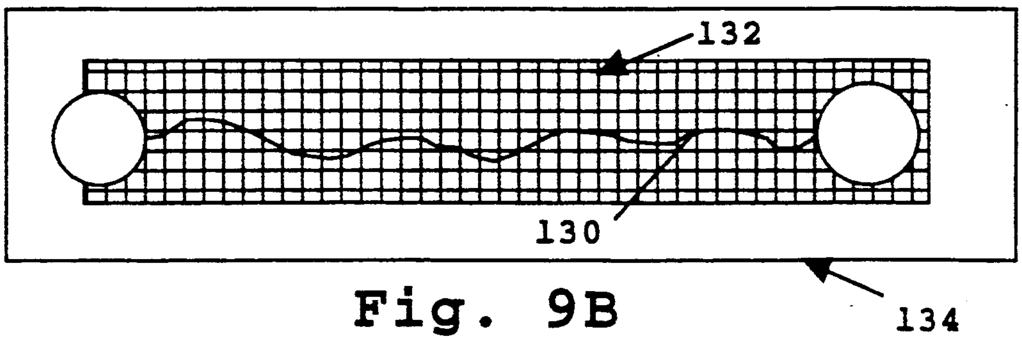
Fig. 9B

METHOD FOR OPTICALLY MANIPULATING POLYMER FILAMENTS

FIELD OF THE INVENTION

The present invention relates to an apparatus for optically manipulating microscopic particles, and to a method for preparing nucleic acid fragments for examination in an extended form.

REFERENCES

Ashkin, A., et al. Optics Lett., 11(5):288 (1986).
Dunlap, D. D., et al., Nature, 342:204 (1989).
Humphries, Robertson, M., Nature, 306:733 (1983).
Maniatis, T., et al., *Molecular Cloning: A laboratory Manual*, Cold Spring Harbor Laboratory (1982).
Smith, S. B., et al., Science 243:204 (1989).
Wilcheck, M., et al., Anal Biochem 171:1 (1988).
Williams, C. C., et al., Nature, 344:317 (1990).

BACKGROUND OF THE INVENTION

Much of the current research effort in molecular genetics is aimed at localizing genes, determining relative gene positions along chromosomes or DNA filaments, and determining their nucleotide sequences. One major application of gene localization is in understanding and predicting certain genetic disease states. For example, traslocation of marker genes from one chromosomal location to another may play a role in the development of cancer (e.g., Robertson). Also a number of inheritable diseases have been identified by their genetic linkage to observed restriction fragment polymorphisms (e.g., Humphries), and considerable effort has been devoted to identifying the sites of the gene defects in particular chromosome regions associated with the polymorphisms.

Heretofore, gene and probe-site localization along a mammalian chromosome or DNA filament has been approached either by classical studies on gene linkage related to inheritance or by in situ hybridization techniques. In the gene linkage approach, the frequency of co-inheritance of one phenotypic trait, whose gene location is unknown, with a phenotypic trait whose gene location is known provides a measure of the distance (linkage) between the two genes. The classical approach is quite limited in man, where family inheritability patterns must be relied upon. Even in animals where controlled breeding is possible, genetic studies are unable to resolve distance of less than about 5 to 10 million basepairs.

Genomic DNA regions of unique sequence can be localized on a chromosome by in situ hybridization. Typically, this is done by hybridizing a radiolabeled probe with a single-strand filament which is also radiolabeled, but at a lower specific activity. The strand is then developed autoradiographically, and the probe is localized by counting the distribution of grains on the film. This method is quite slow, often requiring several weeks for film development and multiple samples in order to achieve statistically meaningful grain distribution patterns for probe localization. Even then, the method cannot resolve locations closer than about 5–10 million basepairs.

Although attempts to map the location of fluorescent-labeled probes on a DNA strand by fluorescence microscopy have been reported, this approach has been severely limited heretofore. A major limitation is the tendency of nucleic acid fragments to form supercoiled, essentially globular structures in solution, making it difficult or impossible to localize the probe or determine distance relationships among probes or between a probe and an end of the filament. The tendency of DNA to form tangles also frustrates direct sequencing using nanometer-scale probe microscopy, such as scanning-tunnelling microscopy.

According to one feature of the present invention, it is now possible to extend long nucleic acid filaments in solution, and to detect a single probe, such as a fluorescence-labeled DNA probe, with 100 base pair precision along a nucleic acid filament. The method for extending nucleic acid filaments in solution, in accordance with the invention, employs single-beam gradient force optical trapping to capture and move a microscopic particle attached to one end of a DNA filament. The experimental observation of single-beam optical trapping was first described by one of the inventors and his coauthors (Ashkin). Briefly, single-beam optical trapping employs a single, strongly focused beam in which the particle is trapped at a point near the focus of beam. The particle is held in the trap by the axial gradient force, which is proportional to the gradient of the light intensity and points in the direction of increased intensity.

The success of the single-beam optical trap depends on the ability to stabilize the particle at beam focus, and this in turn, is related to the intensity of the incident light beam at the point of focus and the strength of the axial gradient force. In general, the conditions necessary for single-beam optical trapping of particles can be achieved in a stationary-beam arrangement by directing a beam through a strongly convergent (high numerical aperture) objective lens (Ashkin).

In the method of the invention, where the optical beam is used to manipulate the position of a particle in a liquid film on a microscope stage, it is convenient to move the trapping beam relative to the stage, typically by moving the source beam to produce a selected movement in the trap. However, if the source beam is simply moved with respect to the surface of the optical trap (objective) lens, by a mirror or lens steering the trapping beam, the intensity of light (and thus the trapping force) at the trap will vary with position, making it difficult to maintain the beam in a trapped condition as the beam is manipulated.

SUMMARY OF THE INVENTION

It is one general object of the invention to provide a single-beam optical trapping apparatus which produces an optical beam whose trapping force is substantially independent of position within a view field.

Another general object of the invention is to provide an apparatus and method for preparing and examining nucleic acid filaments in an extended form.

In one aspect, the invention includes apparatus for manipulating a particle in the size range of about 10 nm to 10 μm by single-beam gradient optical trapping, and typically between about 0.1 and 1 μm. The apparatus includes a chamber which supports a film of fluid in which the particle can be immersed and through which the particle can be moved. The optical trap is produced by directing a collimated beam of coherent light through a high-numerical aperture objective lens, with the beam substantially filling the lens. The collimating beam is produced by directing a divergent, coherent beam from a movable light source through a collimating lens which is positioned to (a) shift the angle by which the collimated beam is directed against the objective lens, to shift the position of the optical trap, and (b) maintain the position of the collimated beam substantially fixed in the plane of the objective lens, so that the beam fills the lens at any angle and the light intensity of the trap is substantially independent of position.

The apparatus also includes an optical system for viewing the region of the chamber in which the optical trap can be moved. For detecting molecular fluorescence events, the optical system may include a laser illumination light for illuminating the manipulation region of the chamber with pulsed, high-energy coherent light.

Also disclosed is a method for preparing a polymer filament for microscopic examination in an extended condition. One end of the filament is coupled to a particle in the size range of about 10 nm to 10 μm, preferably in the 0.1 to 1 μm range, and the particle and filament are suspended in a fluid film in a chamber. With the other end of the filament anchored to the chamber, the particle is captured in an optical trap produced by directing a beam of divergent, coherent light through a collimating lens and directing the resulting collimated beam through a high-numerical aperture objective lens, as described above.

In one preferred embodiment, the trapping force of the optical beam is adjusted to a selected level, and the filament is stretched to a position at which the particle can just escape from the trap. The particle is then recaptured, returned to this position, and attached to the chamber, to place the filament under a selected stretching force.

In another preferred embodiment, the filament is fixed in its condition by fusing the particle to the chamber, using the heat of the optical trap to melt the particle at a selected filament-extended position.

The invention also includes a method of nucleic acid sample preparation, for examining the filament in an extended condition. In one embodiment, the filament is coupled at each end to a particle bead, such as by a phosphoamidate linkage. One of the particles is captured with the trapping beam in the optical trap and anchored to the chamber by optical welding, fusing the particle with the surface of the view chamber. The other particle is then captured in the trap and moved to place the filament in an extended condition. The stretching force applied to the filament in extension may be calibrated, to achieve a desired degree of filament stretching, and therefore a known relationship between observed linear distance along the filament and number of filament basepairs.

The extended nucleic acid filament may be examined in real time by fluorescence microscopy, for mapping or localizing the binding sites of sequence-specific fluorescence probes or enzymes, for measuring the kinetics of enzyme or ribosomal attachment to or movement along the filament, or for observing filament splicing events, such as are promoted by topoisomerase or recombination enzymes. The location of a fluorescently labeled binding molecule can be determined with a precision of between about 30-100 basepairs.

Alternatively, the extended DNA may be examined at high resolution (near basepair resolution) by nanometer-scale probe microscopy, such as force-filed microscopy.

These and other objects and features of the invention will be more fully understood when the following detailed description is read in conjunction with the drawings.

BRIEF DESCRIPTION OF THE DRAWINGS

FIG. 7 shows a hypothetical plot of filament stretching force as a function of filament length;

FIGS. 9B and 9C illustrates steps in preparing an extended nucleic acid filament on a substrate, for high resolution microscopy.

DETAILED DESCRIPTION OF THE INVENTION

I. Particle Manipulation Apparatus

Figure 1:
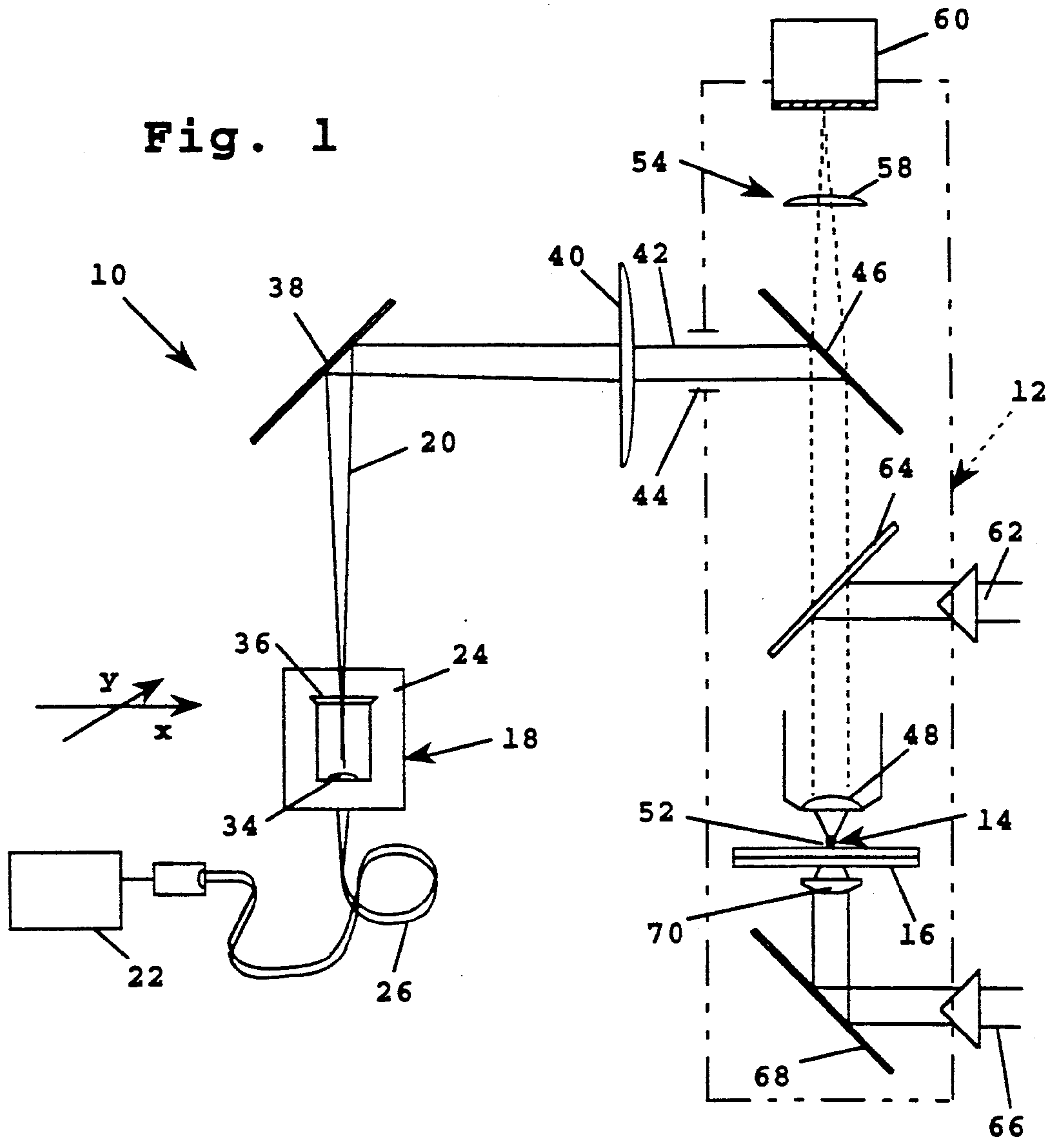
FIG. 1 is a schematic view of an optical trap apparatus constructed according to the present invention.

FIG. 1 is a schematic view of a single-beam optical trap apparatus 10 constructed according to the present invention. A modified fluorescence microscope 12 in the apparatus provides part of the optical train in a single-beam optical trap, and also provides optics for viewing a region of a chamber 14 where particle manipulation takes place, in accordance with the invention. The chamber is mounted on a conventional microscope stage 16 which allows positioning in the plane of the stage, and vertical positioning, conventionally.

Considering first the components of the optical trap in the apparatus, a movable light source 18 is designed to produce a movable beam 20 of divergent coherent light. Source 18 includes a adjustable-power laser 22 which outputs a coherent optical beam. The laser may be a visible-light laser, such as an argon ion laser (514 nm), a near infrared diode laser (e.g., 830 nm), or an infrared Nd YAG laser (1.06 μm). The power requirements are in the range 1 mW to 1 W.

The laser output beam is directed to a moveable platform 24 in the light source by an optical fiber 26 coupled conventionally to the laser. The fiber end is mounted on platform 24, and directs a source beam through a lens system which consists of a microscope objective lens 34 and a diverging lens 36. The lens system functions to decrease the divergence of the light out of the fiber. Platform 24 conventionally includes a pair of micrometers (not shown) for movement in the X-Y plane.

The divergent light beam from the movable light source is reflected by a reflector 38, and the reflected beam is directed at a collimating lens 40 which is mounted on the side of microscope 12. Lens 40 functions to produce a collimated beam 42 which is directed through an opening 44 in the microscope, and reflected by a dichroic beam splitter 46 toward an objective lens 48 at the bottom of the microscope, as will be described below. One suitable collimating lens has a 2 inch diameter, and a focal length of between about 30–50 cm.

Figure 2:
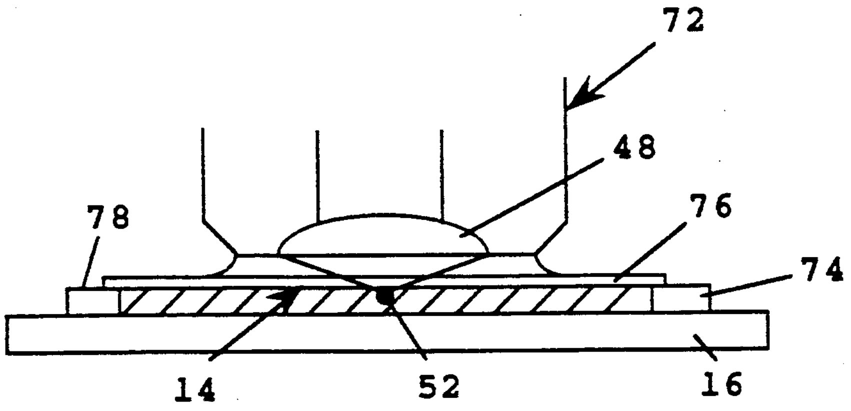
FIG. 2 is a schematic view of a chamber in the apparatus, showing the manipulation region where particle trapping and manipulation occurs.

Lens 48 in the optical train of the trapping beam is a high-numerical aperture objective lens effective to produce a strongly convergent optical beam trap 52 at selected locations within chamber 14, when a beam of collimated light substantially fills the lens, i.e., the back aperture of the objective lens, as will be described below. The lens is preferably a liquid-immersion type, and is placed against the chamber as illustrated in FIG. 2 below. By "high numerical" aperture is meant a numerical aperture of at least about 0.8 and preferably between about 1.2 or greater.

Microscope 12 includes an optical system 54 for viewing the region of chamber 14 where particle manipulation occurs. The viewing system conventionally includes objective lens 48, a tube lens 58, a microscope eyepiece and an image-intensified video camera 60 or other electro-optical imaging device. Illumination for fluorescence microscopy is provided by a fluorescence light source, indicated by arrow 62, whose beam is directed onto lens 48 by a second dichroic beam splitter 64. One suitable fluorescence light source is an argon laser capable of operation in the UV spectrum or at 488 or 514 nm with power up to 1 watt.

For single-molecule fluorescence imaging, it may be necessary to suppress image degradation by Raman light scattering from water molecules in order to view the low-level fluorescence emitted by one or a few fluorescent reporter molecules. This can be accomplished using a mode-locked argon or frequency-doubled Nd-YAG laser operated in a pulsed high-intensity mode to take advantage of fluorescence lifetimes of several nsec. Background scattered light, such as Raman scattering, is eliminated if the image is accumulated only during the time, typically about 5 nsec, that the laser light is "off", i.e., between pulses. Timing devices for synchronizing the laser pulses and video detection system are known. Enhanced signal/noise ratios of fluorescence events can also be achieved using evanescent-wave fluorescence illumination, by known techniques.

Illumination for brightfield microscopy is provided by a visible light source, indicated by arrow 66, a mirror 68 and condenser lens 70, as shown.

FIG. 2 is a schematic illustration of the objective lens and stage region of the apparatus. The figure shows at 72 the lower end of the lens system for the microscope objective, including objective lens 48. Chamber 14 in the figure is formed by a glass slide 74 carried on stage 16, and a coverslip 76 placed over a thin film of liquid on the slide. An oil drop 78 is placed between the objective lens and coverslip. As seen, the optical system is designed to focus the optical trap in the thin-film chamber between the glass slide and coverslip. The view region, i.e., the region in which the beam can be manipulated, lies directly below the objective lens in the thin film chamber.

Figure 3:
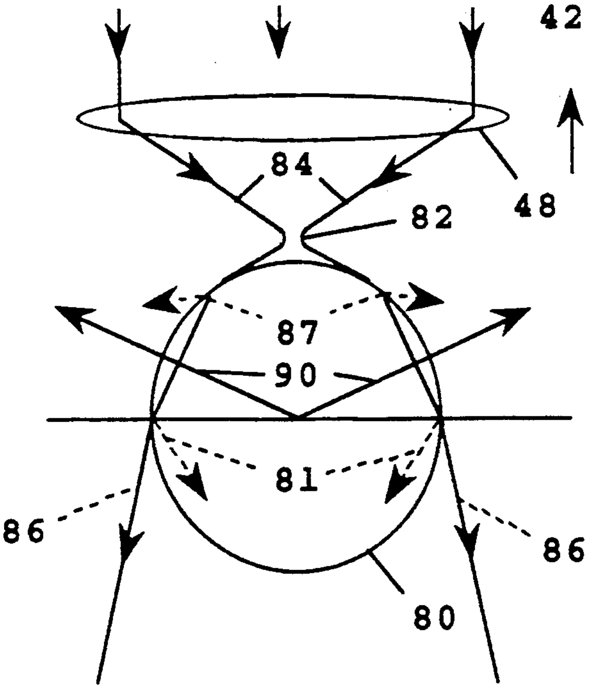
FIG. 3 shows the ray optics of a spherical dielectric particle trapped in an highly convergent optical beam.

FIG. 3 is a ray diagram which illustrates the physical forces in a single-beam optical trap. As seen, the light rays of collimated beam 42 are strongly converged by lens 48 to a focal region 82 just above the location of particle trapping. The diagram shows the scattering of a pair of rays 84 by a dielectric spherical particle 80. The rays 86 in the figure represent rays which are refracted by the particle, and the rays 87 and 88, surface reflection rays. It can be appreciated from the difference between the angles of rays 84 and 86 that the particle acts as a positive lens.

The forces indicated at 90 in the figure represent the intensity of the gradient force on the particle due to refraction of rays 84 by the particle. This gradient force is proportional to the gradient of the intensity of the refracted rays and points in the direction indicated by vectors 90. When the optical beam forming the trap is strongly convergent, the net gradient force applied to the particle is sufficient to (a) balance the downward force due to the transfer of momentum to the beam and (b) stabilize the particle axially. The light rays which produce particle trapping are also referred to herein as an optical beam trap.

As discussed above, the ability of the trap to stably trap microscopic particles, especially in the nm range, in the Z direction depends upon strong lens convergence in the objective lens. An additional condition for stagle particle trapping is the requirement that the Boltzman factor $\exp(-U/kt) << 1$, where U is the potential of the gradient force and is proportional to the square of the beam power (Ashkin). At this condition, the time to pull the particle into the trap is much less than the time for the particle to diffuse out of the trap by Brownian motion, and the particle tends to remain in a trapped condition. The smaller is $\exp(-U/kT)$, the longer a particle can be expected to remain trapped in a beam of a given power. It has been shown, for example, that a 1.0 μm dielectric sphere can be trapped for tens of minutes at a beam power of a fraction of a mW. Particles of about 0.109 μm can be stably trapped for 25 seconds at 1 mW power (Ashkin). Trapping over a size range from Rayleigh particles as small as 10 nm, to Mie particles up to 10 μm in size is practical with the single-beam methods.

It will be recognized that the generally preferred beam power is one just sufficient to stably trap the particle being examined, since excessive power levels will cause greater beam damage to the particles over time. It is also noted that where Z-direction (vertical) trapping is not required, i.e., where the particle is dragged along the bottom of the view chamber, the particle can be held stably at a much lower gradient force. The numerical aperture of the lens for this purpose may accordingly be relatively small, e.g., about 0.6–0.8.

Figure 4A:
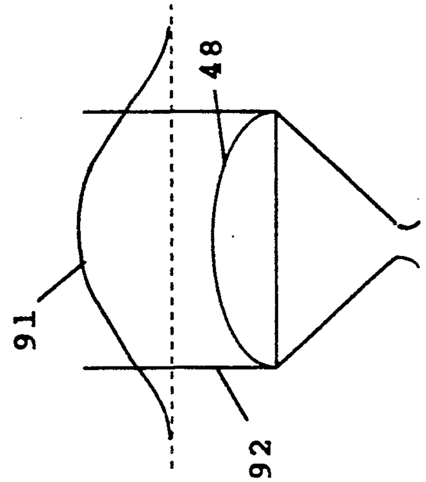
FIGS. 4A–4C illustrate the gradient force at the optical trap under conditions where a collimated beam fills the objective focusing lens (4A), where the same beam is shifted off-center, to move the position of the trap (4C), and where a small-width beam which does not fill the lens is used (4C)
Figure 4B:
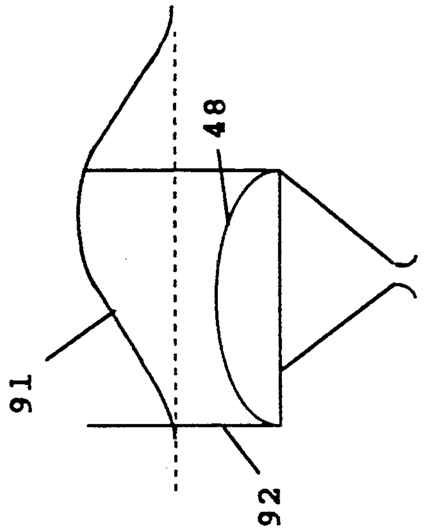
Figure 4C:
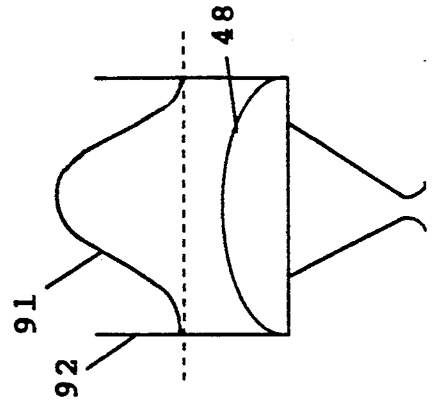

FIGS. 4A–4C illustrate the effect of beam width and placement on the position and gradient force of an optical trap formed by a strongly convergent objective lens, such as lens 48. The upper portion of each figure shows the Gaussian distribution 91 of beam intensity with respect to a cylindrical surface 92 formed by a vertical projection of the perimeter of the lens. FIG. 4A represents the case where the beam substantially fills the lens, i.e., where the beam is centered with respect to the lens, and has a significant intensity, e.g., 50% of maximum intensity, at the beam perimeter. This configuration produces a relatively steep, symmetrical gradient force at the optical trap, as is required for efficient particle trapping.

FIG. 4B shows the effect of shifting the beam in FIG. 4A laterally with respect to the lens, to shift the position of the optical trap. It can be appreciated that movement away from the centered position reduces the gradient intensity of the focused beam. Thus, the trapping force of the beam decreases proportionally as the beam is moved further away from its central position.

In FIG. 4C, the collimated beam directed onto the objective lens has a narrower beam width which does not fill the lens, i.e., the beam intensity at the lens perimeter is quite low. As a result, the focused optical beam is less steep than in the FIG. 4A configuration, with a corresponding loss of gradient force at the optical trap. It will be appreciated, however, that the gradient force of the beam is not reduced significantly when the collimated beam is shifted away from its central position, since the extent to which the lens is filled is less dependent on beam position. The FIG. 4A–4C examples illustrate the limitations in manipulating an optical trap position by laterally shifting the position of a source on the objective lens.

Figure 5:
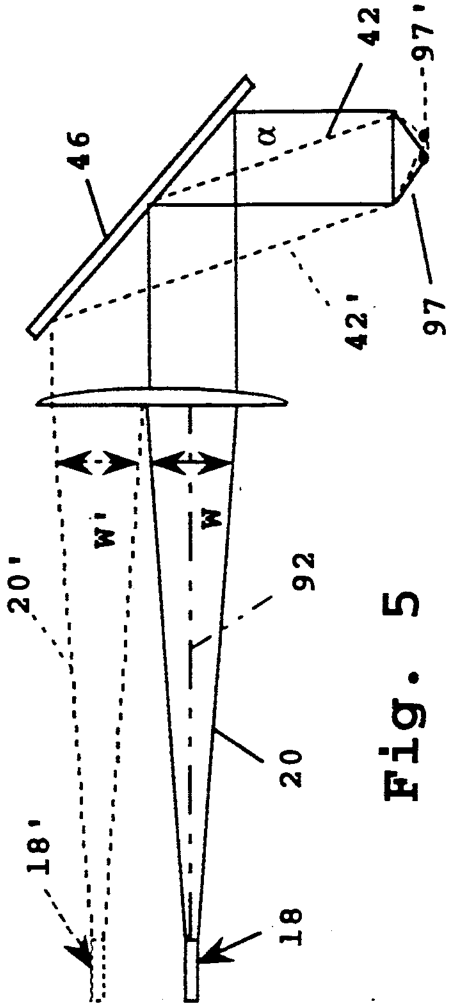
FIG. 5 is a ray optics diagram illustrating movement of the optical trap.

FIG. 5 is a ray diagram showing how the optical beam trap is moved in the apparatus of the invention, without loss of gradient force at the optical trap. The optical path shown in the figure is identical to that shown in FIG. 1, except that reflection from reflector 38 is omitted. The solid ray lines in the figure show the optical rays of a divergent beam 20 from light source 18 positioned along the axes (dash-dot line 92) of collimating lens 40 and objective lens 48. As shown, the collimating lens produces a collimated beam 42 which substantially fills the objective lens, as illustrated in FIG. 4A. This condition requires that the width of the divergent beam at the collimating lens, indicated at W, is such as to fill the objective lens, as illustrated in FIG. 4A. The position of the optical trap is indicated at 97.

The dotted ray lines in the figure represent the optical rays produced when source 18 is moved away from its axially aligned position to the position shown in dotted lines at 18'. As shown, the divergent beam 20A' is now directed against the "upper" portion of the collimated lens, with a width W, similar to width W. According to an important feature of the optical configuration, the collimated lens is constructed and positioned to produce a collimated beam 42, which is directed toward objective lens 48 so as to substantially fill the lens, at an angle $\alpha$ with respect to the lens axes. That is, lens 40 functions to (a) shift the angle $\alpha$ by which the collimated beam is directed against the objected lens, and (b) maintain the position of the collimated beam substantially fixed in the plane of the objected lens, so that the beam fills the lens. This condition applies at all beam angles g within the viewing area of the microscope.

It will be appreciated from FIG. 5, and from the enlarged ray diagram in FIG. 3, that the shift in the angle of the collimated beam produces a corresponding shift in the position of the optical trap, indicated now at 97'. Thus, shifting the light source laterally in the X-Y plane of platform 24 (FIG. 1) produces a corresponding shift in the optical trap. The movement ratio (movement of the light source/movement of the optical trap) is $f_1/f_2$, where $f_1$ and $f_2$ are the focal lengths of lens 40 and lens 48, respectively, and is typically about 250:1.

It is seen that the apparatus provides a simple optical configuration which allows an optical beam to ge moved to selected positions in a viewing field, while maintaining beam intensity and intensity gradient properties needed for stable particle trapping. The use of the apparatus for manipulating a dielectric particle in a view field, particularly for manipulating a polymer filament to an extended condition, will be described in Section II.

II. Polymer Manipulation Method

The apparatus is used, in accordance with another aspect of the invention, for stretching and securing a linear polymer in an extended condition. In this method, one end of the filament is coupled to a particle, and the filament and particle are immersed in a film of fluid in a chamber, with the opposite end of the filament anchored to the chamber. The particle is trapped in the fluid by an optical trap formed as in Section I, and the trap is manipulated until the filament is in an extended condition.

Figure 6A:
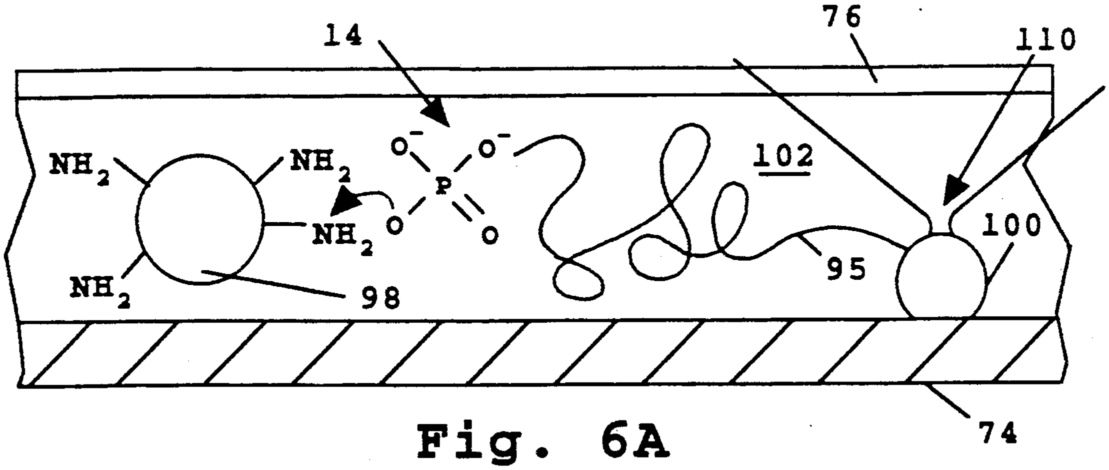
FIGS. 6A–6C illustrate the steps in extending a DNA filament, and fixing the filament in its extended condition, in accordance with one embodiment of the invention.
Figure 6B:
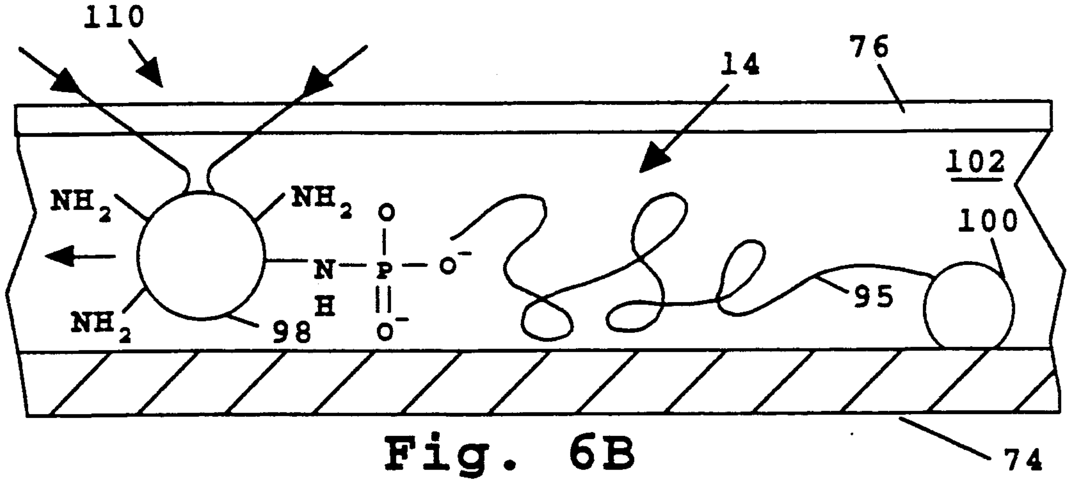
Figure 6C:
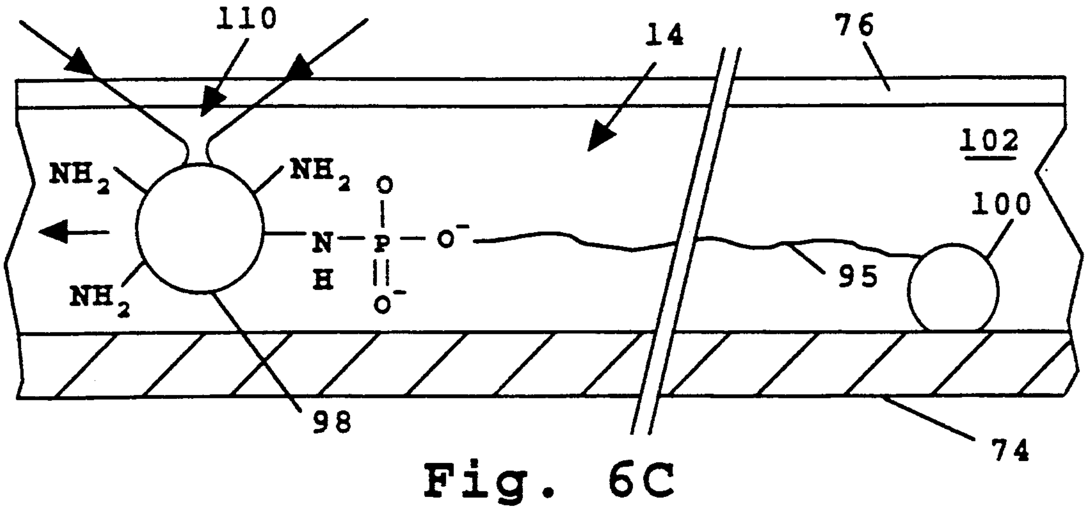

FIGS. 6A–6C illustrate the particle manipulation method of the invention, as applied to manipulating a filament of DNA. Each figure shows a portion of a chamber 14 containing a filament 95 and filament-end particles 98, 100 suspended in a fluid film 102 between a glass slide 74 and a coverslip 76, as in FIG. 2. In one preferred embodiment, the fluid film is an viscous aqueous polymer solution, such as a solution containing 1–2 weight percent polyethylene glycol or methylcellulose. The viscosity of the solution is effective to quench the Brownian motion of large molecules, such as the DNA filament.

Typically, the filament is double-stranded DNA. Alternatively, the filament may be single-stranded DNA or RNA, or chromosome or chromosome-fragment filaments. Chromosomes and DNA and RNA filaments of selected sizes can be isolated and, optionally fragmented and/or sized according to well-known methods.

In one preferred embodiment, particles 98, 100 are amine-coated particles which can ge coupled covalently to the 5'-end phosphate groups of nucleic acid filaments through phosphoamidate bonds, as shown for particle 98 in FIGS. 5B and 5C (Particle 100 is similarly coupled to the 5' phosphate of the opposite strand of the duplex filament). Suitable particles are amine-coated polystyrene beads, 0.5–1.0 $\mu$m supplied by Polysciences, Inc. (Warrington, Pa.). The particles are coupled to the beads in the presence of a water-soluble carbodiimide, under standard coupling conditions. Typically, the concentration of filaments in the film is about $10^9$ molecules/cc, each with beads coupled to its ends. Alternatively, the beads may be coupled to small stick-end or blunt-end duplex fragments which can then be ligated to the filament of interest by known ligation methods. This approach allows specific attachment of filaments whose ends have the complementary sticky end sequence as the fragments attached to the particles.

In an alternative method (not shown), the filament ends are coupled to particles by ligand/anti-ligand binding. In one specific method, the opposite ends of a nucleic acid filament are biotinylated, for example, by ligation to a biotinylated linker, or by nick translation in the presence of biotinylated deoxynucleoside triphosphosphates, according to known methods (Wilchek). The filaments are allowed to react with avidin or streptavidin-coated beads, such as are available commercially, e.g., from Polysciences, Inc. to form high-affinity binding of the filament ends to the particles.

After the filament ends are coupled to the particles, one of the particles is fastened to the bottom of the slide. This can be done readily, in accordance with one aspect of the invention, by capturing the particle in the optical trap, indicated at 110 in FIG. 6B, and with the particle positioned near surface of the slide, optically adhering the bead to the slide surface, as shown in the figure. In capturing the particle, and placing it against the glass slide, it may be necessary to adjust the vertical position of the microscope state. Optical adhering is done by holding the captured particle against the chamber until the portion of the particle in contact with the chamber melts under the laser heat at the optical trap. Typically, using a polystyrene bead in the size range 0.5 to 1 μm, and a beam power sufficient to hold the particle trapped for several minutes, the particle adheres to the slide within about 20–40 seconds. A variety of other thermopolymers, such as polyethylene, latex, or nylon may be similarly attached to the chamber, to anchor one end of the filament.

With the filament tethered at one end, particle 98 is captured in the optical beam and manipulated to move the particle toward an extended condition. Since double-stranded DNA normally exists in a coiled, somewhat globular form, the molecule will rapidly unwind as it is being stretched. According to an important advantage of the present method, the particle is allowed to rotate in the trap without affecting the forces which provide trapping stability. That is, no torques are applied to the molecule as it is stretched. The optical trap is moved in this fashion until the filament is extended, as illustrated in FIG. 6C, and preferably until a preselected stretching force exerted on the filament is reached, as will be described with reference to FIGS. 7 and 8. At this position, the "free" particle is optically adhered to the chamber as above, to fix the filament in its extended condition. The filament medium may also include topoisomerase enzyme(s) to remove knots in the filament as it is being stretched.

It will be appreciated that the trapping force necessary to maintain the particle in a trapped condition must be greater than the force exerted by the molecule in resisting stretching. An important advantage of the invention is that the trapping force on the particle is relatively invariant as the trap is manipulated in the view field, as discussed in Section I, and this reduces the tendency of the particle to escape from the trap as the beam is moved and stretching forces are applied to the particle.

According to another important advantage of the invention, the optical trap force characteristics make it possible to extend the filament with a selected stretching force. This approach requires first measuring the trapping force of the trap as a function of beam power, using a flow-cell configuration for the particle chamber. Here a spherical particle of a given radius r is captured in the optical trap and the flow velocity of a liquid medium sufficient to dislodge the particle from the trap is measured at each of a number of power levels. From these measurements, the trapping force of the beam as a function of beam power can be determined.

The force required to stretch a polymer filament, such as a DNA filament, can now be plotted as a function of stretching distance, i.e., the particle-to-particle extended length of the filament. This is done by first capturing the free particle end of the tethered filament in an optical trap, at a laser power corresponding to a relatively low trapping force. The particle is then manipulated to stretch the filament, until the filament stretching force pulls the particle from the trap, and the distance between the two particles is recorded. The procedure is repeated at increasing trapping forces (laser power levels), and the observed distances at each power level are recorded. FIG. 7 shows a hypothetical plot of duplex DNA stretch distance as a function of stretching force.

The relatively flat portion of the curve corresponds to initial uncoiling of the filament as it assumes a less globular conformation. The intermediate, steeper portion of the represents the increased stretching force as the filament is stretched from an uncoiled, but irregular, conformation to a substantially straight, extended conformation. Beyond this, additional stretching is accommodating by changes in the dihedral angles of the filament backbone bonds, in directions which lengthen the backbone, and this stretching is accomplished only at a considerable cost in stretching force, as indicated by the steepest portion of the curve.

Typically, the filament will be stretched with a force sufficient to extend the filament close to the elbow in the curve where bond stretching occurs, i.e., where the filament is in a relatively straight, extended condition. The observed distances along the length of the filament can then be calibrated, using filaments of known basepair length, for standardized distance measurements along filaments in an extended form.

Figure 8A:
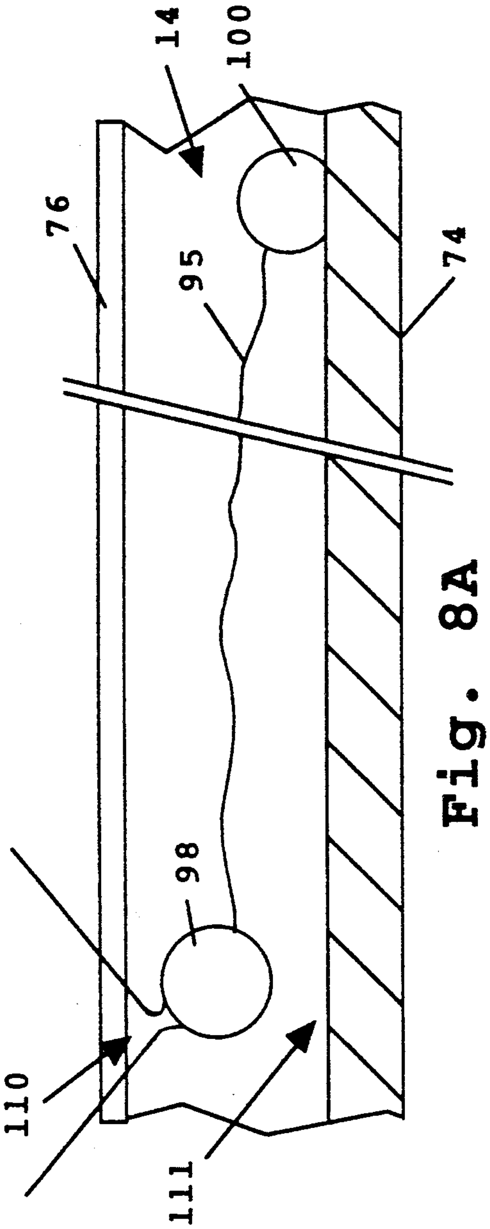
FIGS. 8A and 8B illustrate the steps in extending a duplex DNA at a final known stretching force.
Figure 8B:
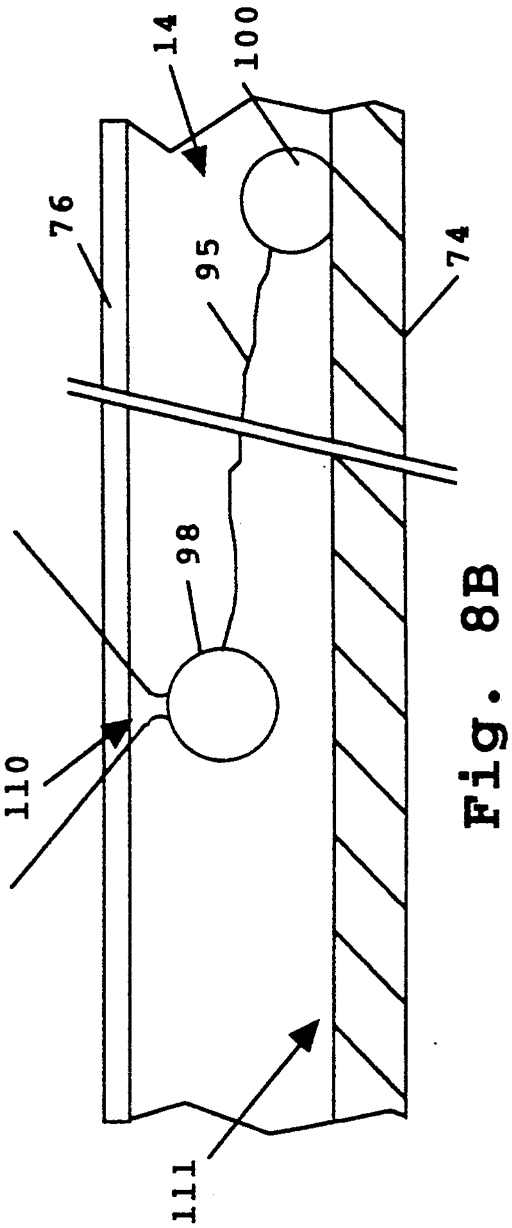

The steps in manipulating a DNA filament in an extended form, with a selected stretching force, are illustrated in FIGS. 8A and 8B, where the filament and particles have the same numbers as in FIGS. 6A–6C. FIG. 8A shows the manipulated-particle end of the filament being moved away from its opposite end in an optical trap 110 having a laser power level corresponding to a selected stretching force. As suggested in the figure, the beam position is one at which the particle is just being pulled from the optical trap. This position, indicated by arrow 11, corresponds to a desired level of filament stretching, and the location is marked, either in relation to crosshairs in the chamber, or by the caliper settings of the platform used for beam movement.

The escaped particle is then recaptured, as shown in FIG. 8B, and returned to the site just preceding the position of particle escape. The particle is then glued at this position by fusing, as above. The filament is now stably fixed on the slide under a selected stretching force, allowing the distances along the filament length to be reproducibly determined and calibrated in terms of numbers of basepairs.

The extended filament may be used to examine a variety of filament binding and kinetic events in real time, as will be described in Section III with respect to nucleic acid filaments. In one general method, a stretched DNA filament is examined by high-magnification fluorescence microscopy. The precision of locating a fluorescent reporter molecule on the filament, using digital analysis of the image recorded by the image-intensified video camera to analyze the intensity distribution of fluorescence emitted by the molecule, is about 10–30 nm, corresponding to about 30–100 basepairs. It is noted that this precision is substantially better than the distance resolution, defined by the ability to resolve two closely spaced signals, which is achievable by fluorescence microscopy.

A variety of fluorescent DNA-intercalating dyes, such as ethidium bromide, may be employed for visualizing duplex DNA. The duplex filament is labeled with the dye conventionally, and unbound dye can be removed by washing. The dye reporter allows the DNA filament to be seen as a fine strand under fluorescence microscopy. The intensity of the dye, i.e., the density of dye in the filament, can be selectively reduced by addition of particles, such as polystyrene particles, which compete with DNA for binding to ethidium bromide. With this technique, the filament can be densely labeled during the filament extension operation, to permit easy visualization of the extended molecule. Thereafter, for examining any reactions of molecules with the filament, the staining dye can be removed so that the dye will not interfere with these reactions. Also removal of the dye may be necessary for contrast enhancement, in order to visualize fluorescent-labeled molecules bound to the extended filament.

Alternatively, the binding molecule can be labeled with a reporter having a different fluorescence absorption peak, allowing the second reporter to be visualized at a second excitation wavelength. Fluorescent-labeled probes suitable for labeling probes, enzymes and or particles are well known. In one embodiment, for use in detecting single-reporter fluorescent events, the illumination source is preferably a pulsed laser which can be operated at high power levels over timed pulsed intervals as short as $10^{-12}$ to $10^{-9}$ seconds. As discussed above, the fluorescence from the reporter is observed only in the interval between excitation pulses, to eliminate background Raman scattering.

For high-resolution, i.e., resolution at the level of a few basepairs, the extended DNA filament can be examined by nanometer-scale probe microscopy, scanning tunnelling microscopy (e.g., Dunlap, Williams), or dehydrated and examined by conventional or scanning electron microscopy.

FIGS. 9A and 9B illustrate a method for examining extended nucleic acid filaments on a substrate in a dehydrated form. Here a nucleic acid filament 130 is extended and fixed in the liquid film in the chamber, as above, over a substrate 132 in the chamber, indicated at 134 in FIG. 9A. The filament in solution may be contacted with a selected binding molecule, such as sequence-specific oliogonucleotide probes, binding proteins, enzymes, histone proteins, ribosomal particles or the like, as described in Section III below, to bind the agent at a site on the filament. The chamber is then drained and the filament is allowed to dry, in its extended form, on the substrate, as shown in top view in FIG. 9B. For examination by transmission electron microscopy, the filament can be stained with conventional tungstate salts or the like. For examination by scanning electron microscopy or force field microscopy, the filament may be metalized, or examined directly.

The advantages of the polymer manipulation method of the invention can be appreciated from the foregoing. The method facilitates particle manipulation by maintaining a relatively constant trapping force on the particle as the particle is moved in the view field. In particular, the particle can be manipulated within the view field at a selected trapping force, and extended to a length corresponding to a known, selected stretching force. This, in turn, provides a standard measure of polymer length, in the extended-filament condition, which can be calibrated in terms of number of polymer subunits.

The method also provides a simple method for attaching the ends of a stretched filament to the chamber, using the optical trap to adhere the particles at the filament ends to the chamber.

According to another feature, the method can be used to extend extremely large nucleic acid fragments, such as genomic fragments in the 1-10 megabasepair size range or larger. Fragments of this size are quite fragile and previous methods for physically extending the fragments have generally been unsuccessful, due to the inability to control the stretching force applied to the filament. In the present method, the stretching force exerted on the filament is never greater than the trapping force exerted on the filament-coupled particle, and this force can be selected to ensure that the filament is not broken as it is extended.

III. Nucleic Acid Filament Preparation

In another aspect, the invention includes a method of nucleic acid filament preparation, for examining the filament in an extended condition. In one general embodiment, the filament is contacted with a sequence-dependent binding molecule, and the binding site(s) in the extended filament are localized by determining the distance from a site from the ends of the filaments, or from one another.

This method is illustrated by the probe localization method described below with respect to FIGS. 10A and 10B, which illustrate a method for restriction-fragment mapping of an entire genomic chromosomal DNA filament. The filament, indicated at 140 in FIG. 11A, is a 1-10 megabasepair genomic duplex fragment having rare restriction sites $S_n$ spaced at intervals having an average spacing, for example of 100-1,000 kilobases. Examples of rare restriction sites are XhoI, with an average spacing between sites of about 200 kbases, SfiI and MluI, with an average spacing of about 500 kbases, and NotI, with an average spacing of about 1,000 kilobases.

The genomic fragments are prepared according to known methods. Where, as here, it is desired to extend an entire chromosomal DNA, isolation must be done with a minimum of disruptive handling procedures. In one known method, chromosomal DNA can be isolated from a cell by treating the cell with proteases and cell disruptive agents to release the chromosomal DNA, which is then drawn into an agarose slab and fractionated by agarose electrophoresis. The selected fragment may be eluted by electrophoresis into a receiving chamber which becomes the viewing chamber where particle attachment to the filament(s) and particle manipulation are carried out.

The genomic filaments are suspended in a standard coupling buffer and the fragment ends are coupled to amine-coated beads, such as beads 142, 144 coupled to fragment 140. The buffer is then replace by a standard hybridization buffer containing 1% by weight methylcellulose (50-100 kdaltons), at a fragment concentration of about $10^9$ filaments/cc, as above.

Figures 10A, 10B:
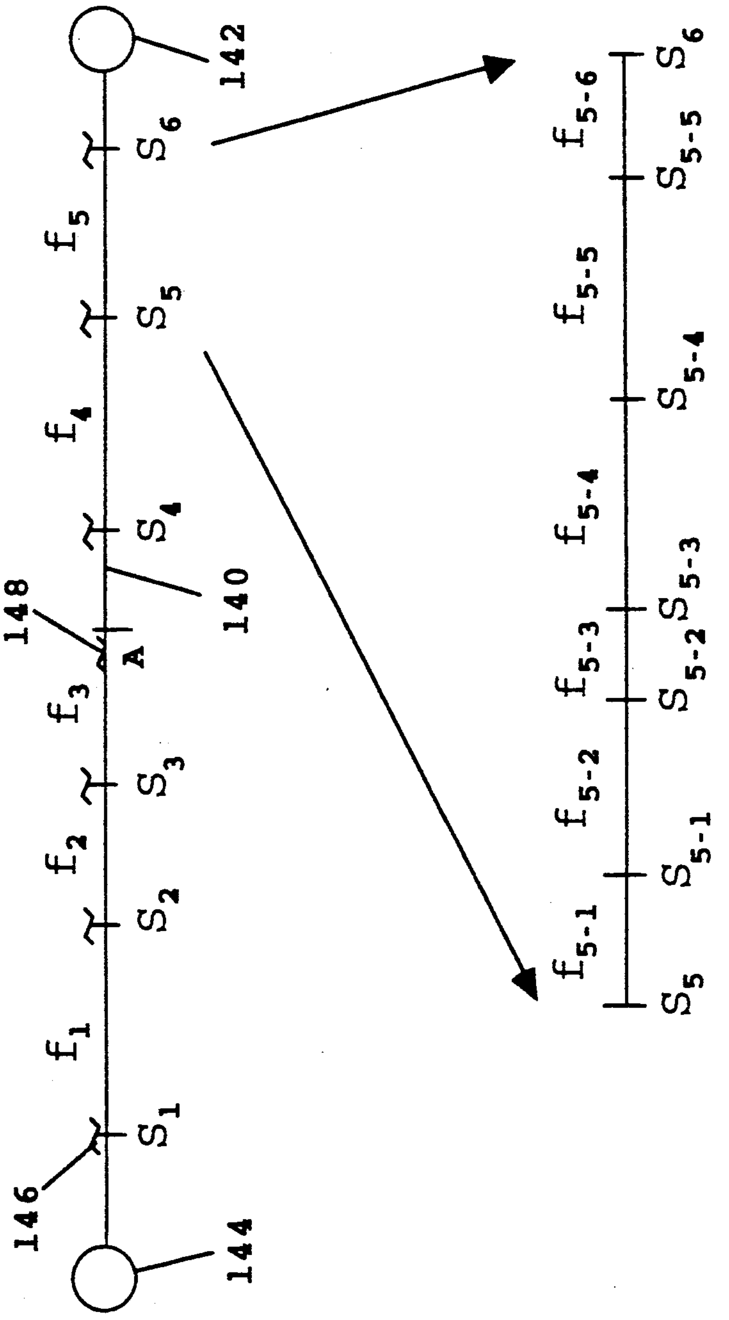
FIGS. 10A and 10B illustrate the use of the method of the invention for restriction fragment mapping in a large genomic fragment.

To the fragment mixture is added a fluorescent-labeled probe, such as DNA probe 146, which is complementary to the selected rare restriction site sequences, such as the NotI sites in the fragments. The probes are mixed with the duplex fragments under partial denaturation conditions which allow probe hybridization with the duplex fragment, according to known methods. Alternatively, the probes may be hybridized to the duplex by RecA-catalyzed D-loop formation. Fluorescent-labeled probes are prepared conventionally.

Where it is desired to examine a fragment containing a known sequence, such as sequence A in FIG. 10A, the desired fragment may be identified by its binding to a fluorescently-labeled probe 148 specific to the known region, but distinguishable from the restriction-site probes on the basis of a different emission or absorption characteristics.

The fragment of interest is manipulated to an extended condition, preferably corresponding to a selected stretching force, as above, and the particles are attached to the chamber surface, as by optical adherence. The extended filament is now examined to determine the distance between fluorescent-labeled restriction-site probes, typically by measuring the distances between probe sites seen in the video camera images. As shown in FIG. 10A, the fragment contains six rare restriction sequences $s_1$–$s_6$ which define five restriction segments $f_1$–$f_6$, with the relative measured lengths shown in the figure. The distances between each of the restriction sites and known sequence A are also recorded.

A higher resolution restriction map can now be made by introducing a fluorescence probe for a more frequent restriction site, under hybridization conditions discussed above. The more frequent sites typically have average spacings of about 50–100 kbases. FIG. 10B shows an enlargement of segment $f_5$, with probes specific to the more frequent restriction site being bound at sites $s_{5-1}$ to $s_{5-5}$ between previously identified sites $s_5$ and $s_6$. The seven restriction sites define six subsegments $f_{5-1}$ to $f_{5-6}$ in segment $f_5$, as indicated. The lengths of these subsegments are determined as above.

A more detailed restriction map may be constructed in this manner by addition of probes specific to other restriction sites. The identified segments may be isolated at any stage by restriction site digestion and fractionation by electrophoresis, according to standard procedures. For example, following the two-probe analysis above, genomic fragments may be digested to completion with the rare cutter restriction enzyme, e.g., NotI, and subfragments having the expected segment size, e.g., of fragment $f_5$, then isolated from the gel. These subfragments may be further digested to completion with the second, more frequent restriction enzyme, and the smaller subfragments again fractionated by gel electrophoresis. Smaller subfragments, e.g., $f_{5-4}$, are identified on the gel by their known size and isolated. These isolated fragments can now be cloned for sequencing, and/or expression, or further analyzed by the mapping method just described.

For high resolution distance measurements, the filament can be suitably prepared for electron microscopy or force field microscopy.

A variety of sequence-specific binding molecules, such as restriction enzymes, enhancers, repressors, transcriptional or translational initiation or termination factors, histones, and ribosomes may be substituted for nucleic acid probes, for localization of binding sites on an extended filament. These DNA-binding agents can be fluorescent labeled by known methods of derivatizing proteins with fluorescent reporters.

In a second general embodiment, the extended filament serves as a substrate for nucleic-acid specific enzymes or ribosomes, for real-time measurements of the rate and/or mechanism of interaction of enzymes or ribosomes with extended DNA. For example, in applying the method to the study of ribosome binding to mRNA, filaments of mRNA are prepared by known methods, coupled at opposite ends to particles, and extended by the optical trap manipulation methods described above. With the mRNA in an extended condition, in vitro translation components are added to the liquid film. Among the determinations which can be made in the method are (i) the time sequence in which the ribosomes become attached to the mRNA filament; (ii) the rate of movement along the filament; and (iii) the fate of the ribosomes in the presence of various translation inhibitors, i.e., whether the inhibitor stops ribosome movement along the strand or causes the ribosomes to detach from the mRNA.

The method may similarly be used to study the mechanisms and kinetics of attachment and movement of RNA or DNA polymerases, reverse transcriptases, reverse topoisomerases (in a pair of crossed, extended filaments) and repair enzyme along an extended DNA filament, employing fluorescently-labeled enzymes.

Although the invention has been described with respect to particular embodiments and methods, it will be clear to those skilled in the art that various changes and modifications can be made without departing from the invention.

It is claimed:

1. A method of preparing a polymer filament for microscopic examination in an extended condition, comprising coupling one end of the filament to a particle in the size range of about 10 nm to 10 gm, suspending the filament and attached particle in a fluid film in a chamber, securing the other end of the filament in the chamber, capturing the particle in an optical trap produced by directing a beam of divergent, coherent light through a collimating lens and directing the resulting collimated beam through a high-numerical aperture objective lens, where the collimating lens is positioned to (a) shift the angle by which the collimated beam produced by directing the divergent beam through the collimating lens is directed against the objective lens, thereby to shift the position of said optical trap produced by directing the collimated beam through the objective lens, and (b) maintain the position of the collimated beam substantially fixed in the plane of the objective lens, so that the beam fills the lens at any beam angle and the light intensity of the trap is substantially independent of position, and moving the source of the divergent light, to produce a corresponding movement of the optical trap, until the filament is in an extended condition.

2. The method of claim 1, wherein said filament is a nucleic acid filament with a 5'-end phosphate group at said one filament end, said particle has surface amine groups, and said coupling steps includes reacting the filament with the particle in the presence of a carbodiimide coupling reagent, to link said one filament end to the particle through a phosphoamidate bond.

3. The method of claim 1, wherein the particle has a size between about 0.1 and 1 $\mu$m.

4. The method of claim 1, which further includes attaching the particle to the chamber when the filament is in an extended condition.

5. The method of claim 4, wherein said attaching includes positioning the particle against a surface of said chamber, and holding the particle at a substantially stationary position in the optical trap for a period sufficient to adhere the particle to the chamber surface.

6. The method of claim 4, which further comprises adjusting the power of the divergent beam source, to produce a trapping force equal to a selected stretching force of the filament, manipulating the particle to a position at which the particle can just escape from the optical trap, under the stretching force of the filament, and attaching the particle the chamber surface at such position.

7. The method of claim 6, wherein the filament is fluorescent-labeled, and the filament is examined in its extended condition by fluorescence-light illumination.

8. The method of claim 6, wherein the filament is labeled with a fluorescent DNA-intercalating dye, and the concentration of the dye in the filament is selectively reduced by addition to the solution of polymer particles effective to binding to the dye.

9. A method of nucleic acid filament sample preparation, for examining a filament in an extended condition within a chamber, comprising coupling one end of the filament to a particle, with the particle and attached filament suspended in a thin film of aqueous medium, and the opposite end of the filament anchored in a chamber, capturing the particle in an optical beam trap, manipulating the position of the particle relative to the other end of the filament, to place the filament in the film in an extended condition, and fixing the filament in an extended condition.

10. The method of claim 9, wherein said fixing includes attaching the particle to the chamber positioning the particle against a surface of said chamber and holding the particle at a substantially stationary position in the optical trap for a period sufficient to fuse the particle to the chamber surface.

11. The method of claim 10, which further comprises adjusting the power of the divergent beam source, to produce a trapping force equal to a selected stretching force of the filament manipulating the particle to a position at which the particle can just escape from the optical trap, under the stretching force of the filament, and attaching the particle to the chamber surface at such position.

12. The method of claim 9, which further includes binding to the filament, a binding agent (i) effective to bind specifically to a selected sequence, and (ii) having a detectable reporter moiety, and determining the position of the reporter moiety along the filament in its extended position.

13. The method of claim 12, wherein said binding includes binding a second sequence-specific probe to the filament, where the two probes are homologous in sequence to the selected base sequences of interest, and determining the distance between the probes with the filament in its extended condition.

14. The method of claim 12, which further includes binding to the filament, such protein having a detectable reporter moiety, and determining the position of the reporter moiety along the filament in its extended position.

15. The method of claim 14, which further includes measuring the distance between the filament ends.

16. The method of claim 14, which further includes contacting a polymerase labeled with a fluorescence reporter with the extended filament, under reaction conditions which promote polymerase activity when the enzyme is bound to the filament as a substrate.

* * * * *

UNITED STATES PATENT AND TRADEMARK OFFICE
CERTIFICATE OF CORRECTION

PATENT NO. : 5,079,169 Page 1 of 4

DATED : Jan. 7, 1992

INVENTOR(S) : Steven Chu and Stephen J. Kron

It is certified that error appears in the above-identified patent and that said Letters Patent is hereby corrected as shown below:

On the title page, "Other Publications"
"cells" should read --cell--.

In Figure 3, the numeral --88-- should be inserted at two places as shown below:

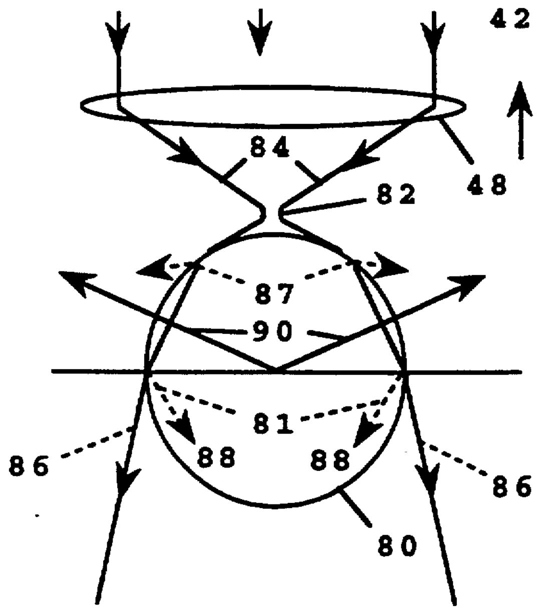

Fig. 3

UNITED STATES PATENT AND TRADEMARK OFFICE
CERTIFICATE OF CORRECTION

PATENT NO. : 5,079,169

DATED : Jan. 7, 1992

INVENTOR(S) : Steven Chu and Stephen J. Kron

It is certified that error appears in the above-identified patent and that said Letters Patent is hereby corrected as shown below:

[continued from page 2]

Col. 10, line 11, "modating" should read --modated--.

Col. 14 (Claim 1), line 24, "gm" should read --μm--.

Col. 15 (Claim 8), line 11, before "binding",
should appear.

UNITED STATES PATENT AND TRADEMARK OFFICE
CERTIFICATE OF CORRECTION

PATENT NO. : 5,079,169

DATED : Jan. 7, 1992

INVENTOR(S) : Steven Chu and Stephen J. Kron

It is certified that error appears in the above-identified patent and that said Letters Patent is hereby corrected as shown below:

[continued from page 1]

Col. 2, line 21, between "the focus of" and "beam" the word --the-- should appear.

Col. 2, line 46, "beam" should read --particle--.

Col. 3, line 65, "filed" should read --field--.

Col. 6, line 18, "momentum to" should read --momentum from--.

Col. 6, line 25, "stagle" should read --stable--.

Col. 7, line 47, "objected" should read --objective--.

Col. 7, line 49, "objected" should read --objective--.

Col. 7, line 51, "angles g" should read --angles $\alpha$--.

Col. 7, line 63, "ge" should read --be--.

Col. 8, line 21, "an" should read --a--.

Col. 8, line, 35, "ge" should read --be--.

Col. 9, line 5, "state" should read --stage--.

Col. 9, line 8, "at" should read --of--.

UNITED STATES PATENT AND TRADEMARK OFFICE

CERTIFICATE OF CORRECTION

PATENT NO. : 5,079,169

DATED : Jan. 7, 1992

INVENTOR(S) : Steven Chu and Stephen J. Kron

It is certified that error appears in the above-indentified patent and that said Letters Patent is hereby corrected as shown below:

Col. 10, line 7, after "of the" insert --curve--.

Signed and Sealed this

Second Day of August, 1994

Attest:

Bruce Lehman

BRUCE LEHMAN

*Attesting Officer*

*Commissioner of Patents and Trademarks*

UNITED STATES PATENT AND TRADEMARK OFFICE
CERTIFICATE OF CORRECTION

PATENT NO. : 5,079,169

DATED : January 7, 1992

INVENTOR(S) : Steven Chu and Stephen J. Kron

It is certified that error appears in the above-identified patent and that said Letters Patent is hereby corrected as shown below:

The following paragraph should appear in Column 1, immediately following the title:

This invention was made with Government support under contracts AFOSR-88-0349 and PHY-88-01045 awarded by the Department of the Air Force and National Science Foundation, respectively. The Government has certain rights in this invention.

Signed and Sealed this

Twentieth Day of June, 1995

Attest:

Bruce Lehman

BRUCE LEHMAN

*Attesting Officer* *Commissioner of Patents and Trademarks*